United States Patent [19]
Munson et al.

[11] Patent Number: 5,768,626
[45] Date of Patent: Jun. 16, 1998

[54] METHOD AND APPARATUS FOR SERVICING A PLURALITY OF FIFO'S IN A CAPTURE GATE ARRAY

[75] Inventors: Bill A. Munson, Portland; Ali S. Oztaskin, Beaverton, both of Oreg.

[73] Assignee: Intel Corporation, Santa Clara, Calif.

[21] Appl. No.: 874,000

[22] Filed: Jun. 13, 1997

Related U.S. Application Data

[63] Continuation of Ser. No. 264,983, Jun. 24, 1994, abandoned.
[51] Int. Cl.⁶ .................................................. G06F 13/00
[52] U.S. Cl. ........................... 395/877; 395/873; 395/509
[58] Field of Search ...................................... 395/877, 872, 395/509

[56] References Cited

U.S. PATENT DOCUMENTS

| | | | |
|---|---|---|---|
| 5,084,841 | 1/1992 | Williams et al. | 365/189.07 |
| 5,267,191 | 11/1993 | Simpson | 365/78 |
| 5,349,683 | 9/1994 | Wu et al. | 395/800 |
| 5,361,255 | 11/1994 | Diaz et al. | 370/58.1 |
| 5,371,849 | 12/1994 | Peaslee et al. | 395/162 |
| 5,379,399 | 1/1995 | Conway-Jones et al. | 395/425 |
| 5,444,853 | 8/1995 | Lentz | 395/250 |
| 5,471,577 | 11/1995 | Lightbody et al. | 395/157 |
| 5,539,527 | 7/1996 | Kajimoto et al. | 358/355 |

*Primary Examiner*—Robert G. Harrell
*Assistant Examiner*—Saleh Najjar
*Attorney, Agent, or Firm*—Blakely, Sokoloff, Taylor & Zafman

[57] ABSTRACT

The present invention provides a direct memory access unit for use in prioritizing the servicing of FIFO buffers in a capture gate array coupled to a video processing device. The capture gate array comprises at least a FIFO input unit having a plurality of FIFO buffers for receiving as input to the capture gate array separated Y, U and V bitmap data entries and a bus interface unit coupled to a video memory bus for outputting the data entries to the video processing device. The direct memory access unit preferably comprises at least a signal generation unit, a logic unit and a control unit. The signal generation unit receives as input from the FIFO unit depth values for the FIFO buffers representing the number of data entries currently stored in respective FIFO buffers in addition to comparators which compare the depth value of each FIFO buffer with at least first and second trip point values stored in at least first and second buffers. The trip point values represent predetermined numbers of data entries within the FIFO buffers, and the second trip point value is set so as to be greater in magnitude than the first trip point value. The signal generation unit then generates a first trip point signal for each FIFO buffer having a depth value equal to or greater than the first trip point value but less than the second trip point value and a second trip point signal for each FIFO buffer having a depth value equal to or greater than the second trip point value. The logic unit is coupled to the signal generation unit and comprises combinational logic for prioritizing the generated trip point signals associated with the respective FIFO buffers. The logic unit further generates FIFO service requests in accordance with the prioritized trip point signals.

15 Claims, 6 Drawing Sheets

METHOD AND APPARATUS FOR SERVICING A PLURALITY OF FIFO'S IN A CAPTURE GATE ARRAY

This is a continuation of application Ser. No. 08/264,983, filed Jun. 24, 1994, now abandoned.

BACKGROUND OF THE INVENTION

(1) Field of the Invention

The present invention relates to the field of video data processing, and more specifically to the use of FIFO buffers in a capture gate array for the temporary storage of video input data.

(2) Prior Art

The capturing of video data may require the separation of luminance (Y) and chrominance data (U and V) into three data streams for storage as separate bit maps. To maximize the use of the available memory bandwidth, this data is normally separated and queued in three input FIFO buffers. These FIFOs have data written to them simultaneously and have the data read from them separately. Typically each FIFO would request service (i.e., a request to write the data stored in the FIFO onto a data bus) from a direct memory access unit to empty the FIFO upon reaching a "FIFO trip point" representing a predetermined level of data entries (i.e., bytes) in the FIFO. This trip point is normally set at a level that leaves enough available entries in the FIFO for storage of any additional data that is received during the time delay between a FIFO service request and the actual servicing of the FIFO.

When there are multiple FIFOs competing for the same bus on the output side, the worse case amount of latency that can be tolerated by each FIFO is a function of the general bus latency plus the amount of time each of the other FIFOs can hold the bus. To optimize the use of memory bandwidth, it is best to generate multiple memory accesses with contiguous addresses so that a FIFO which has been filled can be completely emptied during a single service request. However, due to the nature of the incoming data, which is separated and distributed into three different FIFOs, other FIFOs may require service before the current FIFO is completely emptied. This in essence forces each of the FIFOs to be larger, and hence more expensive, and also requires lower trip points be maintained in each FIFO, thereby promoting a less efficient use of memory bus bandwidth.

Accordingly, it would be desirable to maximize the performance of a plurality of input FIFOs by providing each FIFO with a mechanism to preempt active service of a different FIFO.

SUMMARY OF THE INVENTION

It is therefore an object of the present invention to provide a plurality of FIFOs each having multiple trip points for prioritizing the urgency of FIFO service requests generated by a direct memory access unit of a capture gate array.

It is another object of the present invention to provide a plurality of FIFOs each having at least first and second associated trip point registers for buffering programmable trip point values representing predetermined numbers of FIFO entries, wherein the first trip point value of the first register signals a normal service request and the second trip point value of the second register signals a higher priority service request to allow a FIFO which is almost completely filled to preempt the normal servicing of another FIFO.

It is yet another object of the present invention to provide the above-described trip point registers with associated priority and preemption logic for determining the priority of service requests among the FIFOs and whether any currently active service request needs to be preempted due to a higher priority service request.

It is a further object of the present invention to provide a method and apparatus for sequentially requesting service of a plurality of FIFOs based on the level of contents in one of the FIFOs such that no two FIFOs would require service at the same time.

To accomplish these and other objectives, the present invention provides a direct memory access unit for use in prioritizing the servicing of FIFO buffers in a capture gate array. The CGA is preferably coupled to a video processing device and comprises at least a FIFO unit having a plurality of FIFO buffers for receiving as input to the CGA separated Y, U and V bitmap data entries and a bus interface unit coupled to a video memory bus for outputting the data entries to the video processing device.

The direct memory access unit preferably comprises at least a signal generation unit, a logic unit and a control unit. The signal generation unit receives as input from the FIFO unit depth values for the FIFO buffers representing the number of data entries currently stored in respective FIFO buffers in addition to comparators which compare the depth value of each FIFO buffer with at least first and second trip point values stored in at least first and second buffers. The trip point values represent predetermined numbers of data entries within the FIFO buffers, and the second trip point value is set so as to be greater in magnitude than the first trip point value.

In operation of the present invention, the signal generation unit generates a first trip point signal for each FIFO buffer having a depth value equal to or greater than the first trip point value but less than the second trip point value and a second trip point signal for each FIFO buffer having a depth value equal to or greater than the second trip point value. The logic unit is coupled to the signal generation unit and comprises combinational logic for prioritizing the generated trip point signals associated with the respective FIFO buffers. The logic unit further generates FIFO service requests in accordance with the prioritized trip point signals and transmits these requests to the control unit to commence servicing of the FIFO buffers within the FIFO unit in accordance with the prioritization of the generated trip point signals.

With respect to a preferred (fixed) priority scheme, each FIFO buffer is assigned a priority with respect to each other FIFO buffer and the logic unit will issue a service request to the control unit for the first FIFO buffer having a first trip point signal generated. However, servicing of this FIFO buffer will be preempted upon receipt of either another higher priority first trip point signal or a second trip point signal from a different FIFO buffer. The control unit will then commence servicing of the different FIFO buffer, with this FIFO buffer being serviced either completely where all data entries within the FIFO buffer are written onto the video memory bus or partially where the FIFO buffer is emptied to the level of the first trip point. If the FIFO buffer being currently serviced is being serviced pursuant to a second trip point signal, and another second trip point signal is generated by different, higher priority FIFO buffer, then the control unit will switch the servicing to the higher priority FIFO buffer.

Furthermore, according to an alternate embodiment of the present invention, an arbitration scheme can be established for servicing each of the plurality of FIFO buffers sequentially over a period of time so that no two FIFO buffers would need to be serviced simultaneously. This is accomplished by generating a modulating signal to be transmitted to the DMA controller for sequentially requesting complete servicing of each of the FIFO buffers in order. According to this implementation, the modulating signal can be generated based on the level of contents in one of the FIFO buffers, or alternately, based on the output from a system clock.

BRIEF DESCRIPTION OF THE DRAWINGS

The objects, features and advantages of the present invention will become apparent from the following detailed description in which.

DETAILED DESCRIPTION OF THE INVENTION

A method and apparatus for servicing a plurality of FIFO buffers in a Capture Gate Array is described. In the following descriptions, numerous details such as specific components and circuitry, specific priority schemes, bit map and data transmission characteristics, etc. are given in order to provide a thorough understanding of the present invention. It will be obvious, however, to one skilled in the art that not all the details given are required to practice the present invention. In other instances, well-known components, features, interconnections and the like are not set forth in detail in order to avoid obscuring the description of the present invention.

Figure 1:
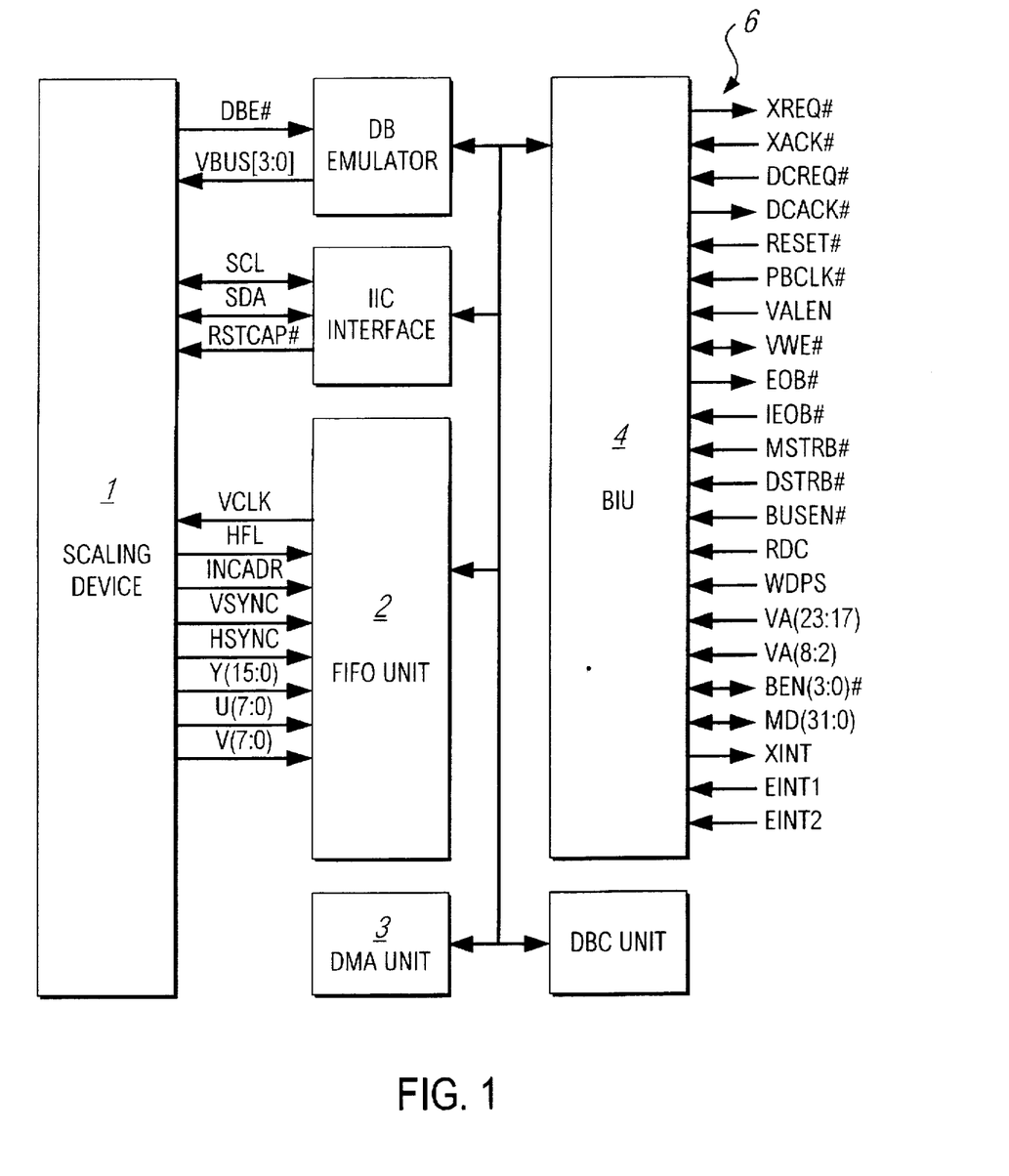
FIG. 1 is a simplified block diagram of a Capture Gate Array (CGA) utilized in a video processing device such as a video conferencing product.

FIG. 1 is a simplified block diagram of a Capture Gate Array (CGA) for use in a video processing device such as a video conferencing product. According to a preferred embodiment of the present invention, the CGA comprises at least a Bus Interface Unit (BIU), a Device Broadcast Control unit (DBC Unit), a Direct Memory Access unit (DMA Unit), a FIFO Input Unit (FIFO Unit), a IIC Interface and a Device Broadcast Emulator (DB Emulator).

Figure 2:
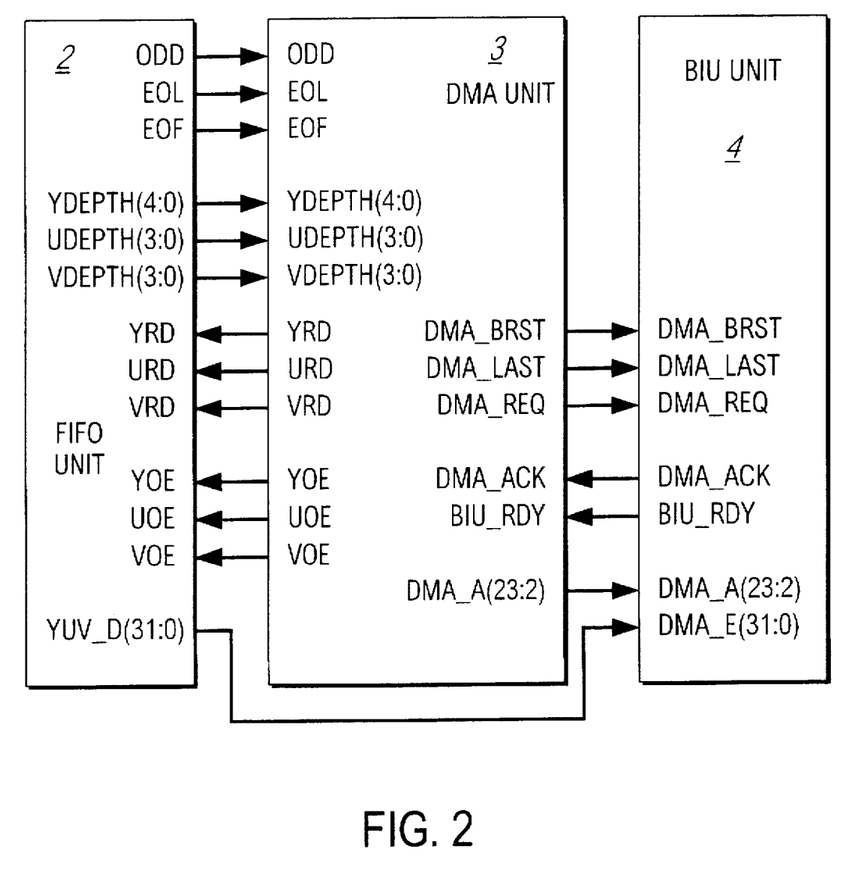
FIG. 2 is a block diagram depicting the interconnections between the Video Input FIFO Unit (FIFO Unit), the Direct Memory Access Unit (DMA Unit) and the Bus Interface Unit (BIU) of the CGA shown in FIG. 1 in accordance with a preferred embodiment of the present invention.

As shown in FIG. 2, the DMA Unit 3 comprises three separate DMA channels for the Y, U, and V bitmaps, respectively. The channels can be programmed to deliver bitmaps to anywhere in the lower 15 MBytes of the video memory bus 6 by means of aligned 32 bit transfers. The DMA registers (not shown) are shadowed such that writes to the DMA registers are loaded into shadow registers and the contents of the shadow registers are copied into the working registers during the capture Vertical Blanking Interval (VBI). The pitch of the bitmaps is programmable in multiples of 16 pixels up to a pitch of 2048 pixels. Each of the DMA channels has its own starting address pointer and shares the limit register with the other channels. The limit register has both an upper and a lower limit so that service requests for an address out of range will not result in a bus cycle, but will stop DMA operation and generate an interrupt if enabled.

In operation of the present invention, service requests to the DMA channels are triggered by programmable trip points implemented in the DMA Unit 3. The service requests generate bus cycles via the DMA Unit 3 to the BIU 4. After the BIU 4 has acknowledged the request, the DMA Unit 3 will provide address and enable data from the FIFOs for a 32 bit aligned write cycle. Because of the consecutive nature of the data, the BIU 4 will continue to accept requests from the DMA Unit 3 and do burst cycles on the video memory bus 6.

The FIFO Unit 2 shown in FIGS. 1 and 2 comprises a set of three input FIFO buffers (not shown) forming a Y FIFO, a U FIFO and a V FIFO for transmitting to the BIU 4 via the DMA Unit 3 Y, U and V data streams, respectively, of an incoming video signal. The FIFO Unit 2 decimates the incoming U, V data to provide 12 bpp (bits per pixel), 9 bpp and 8 bpp (monochrome) formats. The operation of the FIFO Unit 2 is driven by the output of the scaling device 1 (shown in FIG. 1) which, in the preferred embodiment, is a Philip's Electronics Model SAA7186 Video Scalar. When the scaling device 1 has 16 valid pixels, it requests service from the control logic of the FIFO Unit 2 (not shown). At this point, the FIFO Unit 2 transfers 16 pixels from the scaling device 1 in a sequential fashion, while decimating the incoming U and V data (when configured to do so) and pushing separated Y, U and V data stream into the Y, U and V FIFOs, respectively.

A push operation to any one of the FIFOs increments the number of entries in that particular FIFO by one. Each FIFO entry comprises a data word (DWORD) having a predetermined number of bits, with the number being set at 32 bits in the preferred embodiment of the present invention. The number of entries present in each of the FIFOs is signaled by the FIFO Unit 2 to the DMA Unit 3 via the respective YDEPTH, UDEPTH and VDEPTH busses. The YOE, UOE and VOE signals generated by the DMA Unit 3 and transmitted to the FIFO Unit 2 indicate which FIFO is currently being serviced by the DMA controller 33 and is further used to enable the Y, U or Y FIFO's data onto the YUV_D(31:0) data bus. The FIFO Unit 2 pops (or (reads) an entry from either one of the Y, U or V FIFOs when it samples an active read signal from the YRD, URD or VRD signal lines, respectively. Each pop operation to any one of the FIFOs decrements the number of entries in that particular FIFO by one. Finally, the FIFO Unit 2 also decodes additional scalar signals so as to generate three Important control signals to be transmitted to the DMA Unit 3. The ODD signal indicates whether the incoming video data is for an ODD or EVEN field, whereas the EOL and EOF signals indicate the End of Line and the End Of Field conditions, respectively.

Referring again to FIG. 2, the DMA Unit 3 communicates with the BIU 4 using a DMA Request (DMA_REQ) and a DMA Acknowledge (DMA_ACK) signal pair. When the DMA Unit 3 is ready to service one of the DMA channels, it places that channel's current DMA address on the DMA_A(23:2) bus along with a valid DMA_BRST or DMA_

LAST signal, and then asserts the DMA_REQ signal to request service from the BIU 4. The DMA_BRST signal indicates that the DMA channel being serviced has two or more entries to transfer, while the DMA_LAST signal indicates that the DMA channel being serviced has only one entry left to transfer. The DMA_BRST and DMA_LAST signals are used by the BIU 4 to decide whether a single cycle or burst cycle is to be initiated on the video memory bus 6. These signals also give advanced information to the BIU 4 about when to end a burst cycle The BIU 4 then asserts the DMA_ACK signal indicating its readiness to serve the DMA Unit 3's request when it wins the arbitration on the video memory bus 6. While the DMA_ACK signal is active, the DMA Unit 3 samples the BIU_RDY on every clock edge in order to determine when the BIU 4 has successfully transferred one DWORD (32-bits) of data to the video memory bus 6 and is ready for a subsequent DWORD transfer on the next clock edge.

Figure 3:
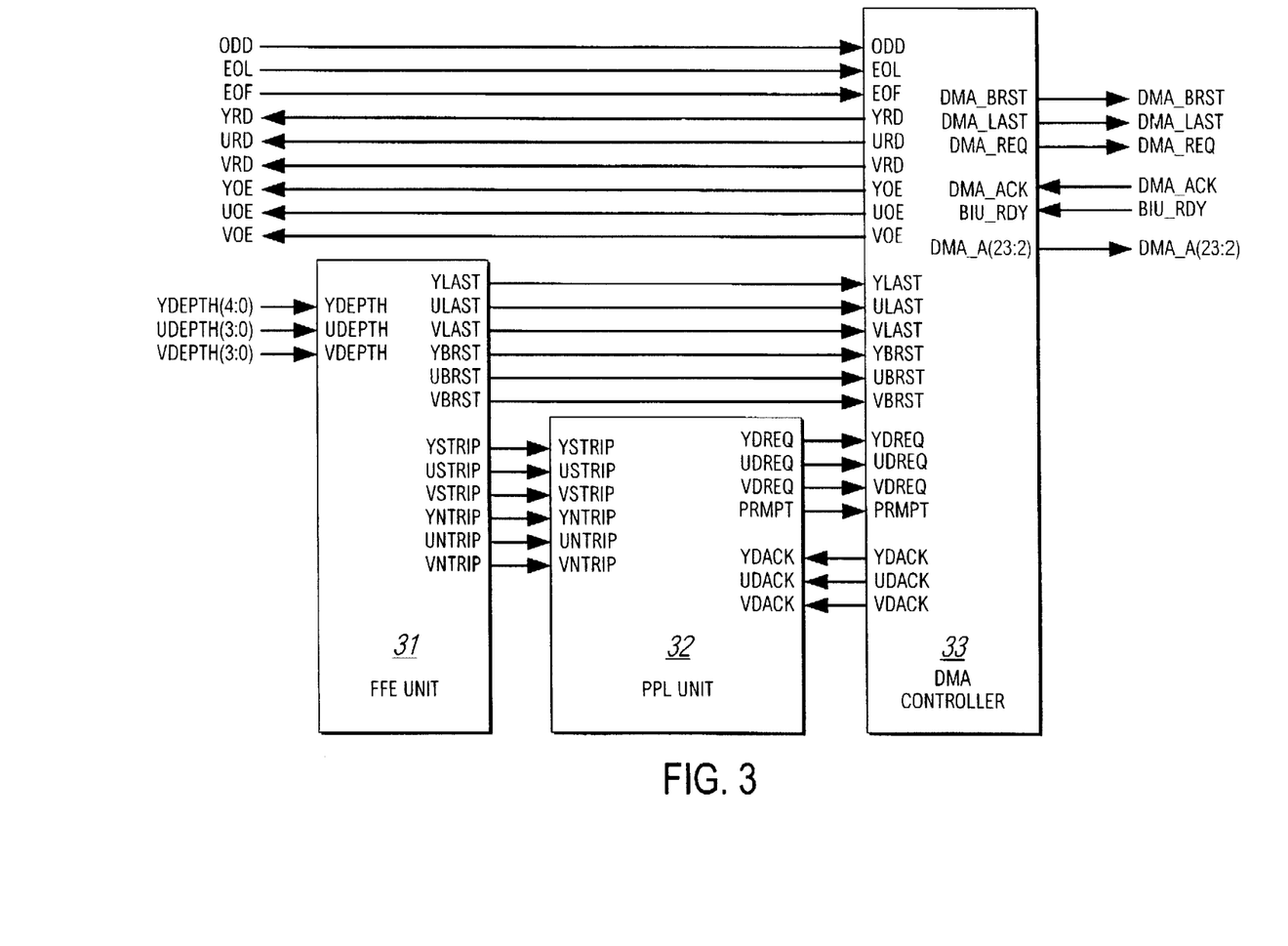
FIG. 3 is a block diagram of the DMA Unit shown in FIG. 2 depicting a FIFO Front End Unit (FFE Unit), a Priority & Preemption Logic Unit (PPL Unit) and a DMA Controller.

As shown in FIG. 3, the DMA Unit 3 further comprises a FIFO Front End Unit (FFE Unit), a Priority & Preemption Logic Unit (PPL Unit) and a DMA controller 33. The FFE Unit 31 of the DMA Unit 3 decodes the depth information received from the FIFOs via the Y, U and V depth busses and generates four control signals for each FIFO. These include respective BRST and LAST signals, which are transmitted to the DMA controller 33 for initiating memory cycles as described above, in addition to respective NTRIP and STRIP signals, which are transmitted to the PPL Unit 32 for signaling the passing of the normal and super trip point values, respectively.

Figure 4:
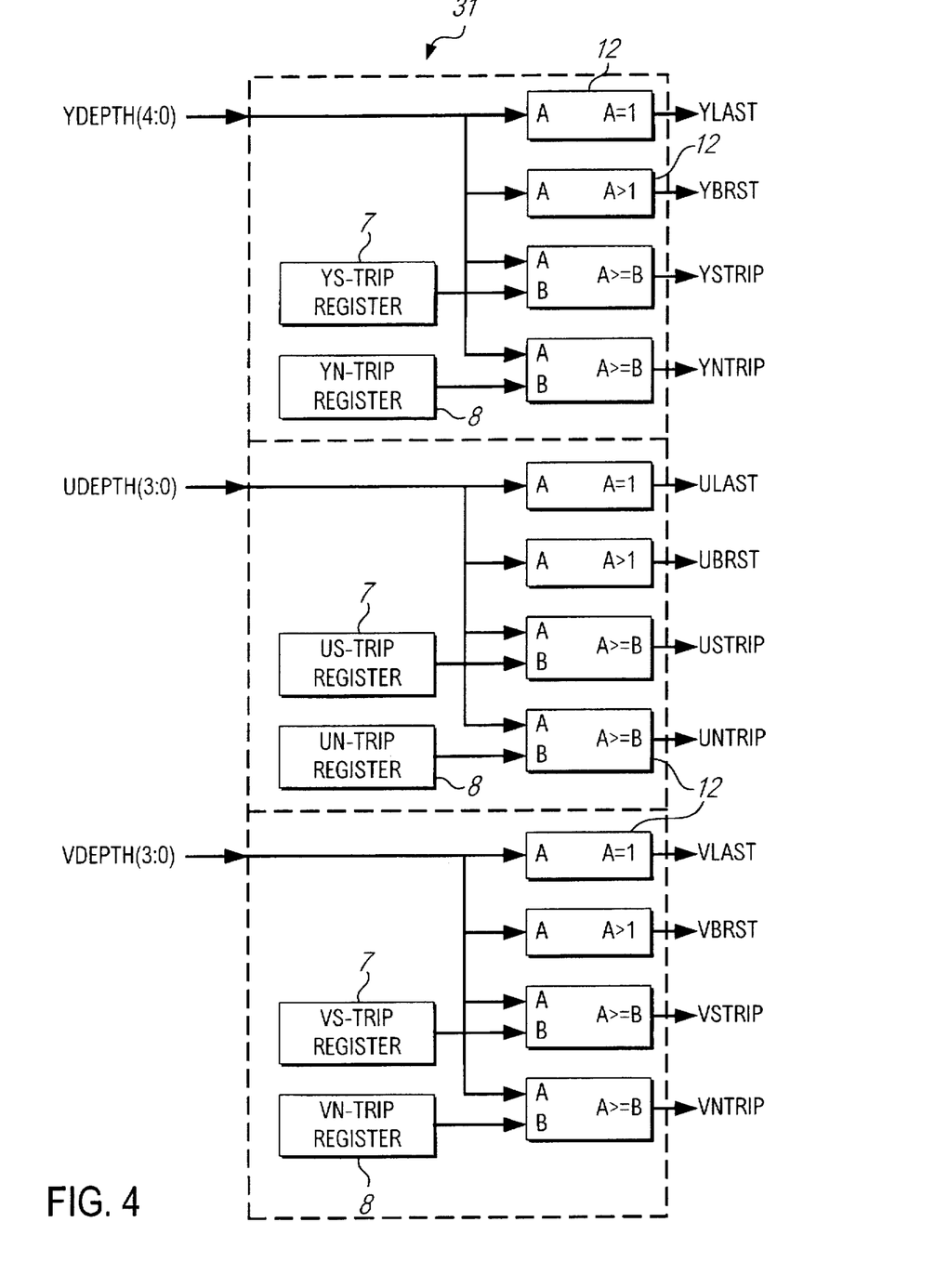
FIG. 4 is a more specific block diagram of the FFE Unit showing the normal and super trip point registers and their associated comparators.

As shown in more detail in FIG. 4, the FFE Unit 31 comprises two trip point registers 7, 8 and four comparators 12 for each FIFO buffer in the preferred embodiment. A normal trip point register 8 is used to buffer values representing a first predetermined level of entries in the respective buffer, whereas the super trip point register 7 buffers values representing a second, greater predetermined level of entries in the buffer. The comparators 12 are utilized for the generation of the LAST and BRST signals described above in addition to first and second TRIP signals for each FIFO buffer. When generated, the TRIP signals are transmitted to the PPL Unit 32 to signal that the number of entries in the respective FIFO buffer has surpassed the respective trip point values programmed into the trip point registers 7, 8.

More specifically, the first set of comparators 12 (i.e., the first comparator 12 for each FIFO) comprise equality comparators 12 for comparing the respective Y, U and V DEPTH buses to one. The respective Y, U and V LAST signals are driven active if the respective Y, U and V DEPTH buses are equal to one, indicating that there is only one entry in the respective FIFOs. The second set of comparators 12 are magnitude comparators 12 for similarly comparing the Y, U and V DEPTH buses to a value of one. In this case, however, the respective Y, U and V BRST signals are driven active if the respective Y, U and V DEPTH buses are greater than one, indicating the existence of two or more entries in the respective FIFOs.

With regard to the third and fourth sets of comparators 12, these comparators 12 are also magnitude comparators 12 for comparing the respective depth buses to the predetermined values stored within each of the respective normal trip point and super trip point registers 7, 8 associated with the respective FIFO buffers. The respective Y, U and V NTRIP signals (representing normal trip point enable signals) are driven active when it is determined that the respective Y, U and V DEPTH buses are greater than or equal to the predetermined values within the respective normal trip point registers 8. Similarly, the respective Y, U and V STRIP signals (representing super trip point enable signals) are driven active if the respective Y, U and V DEPTH buses are greater than or equal to the predetermined values within the respective super trip point register 7.

Figure 5:
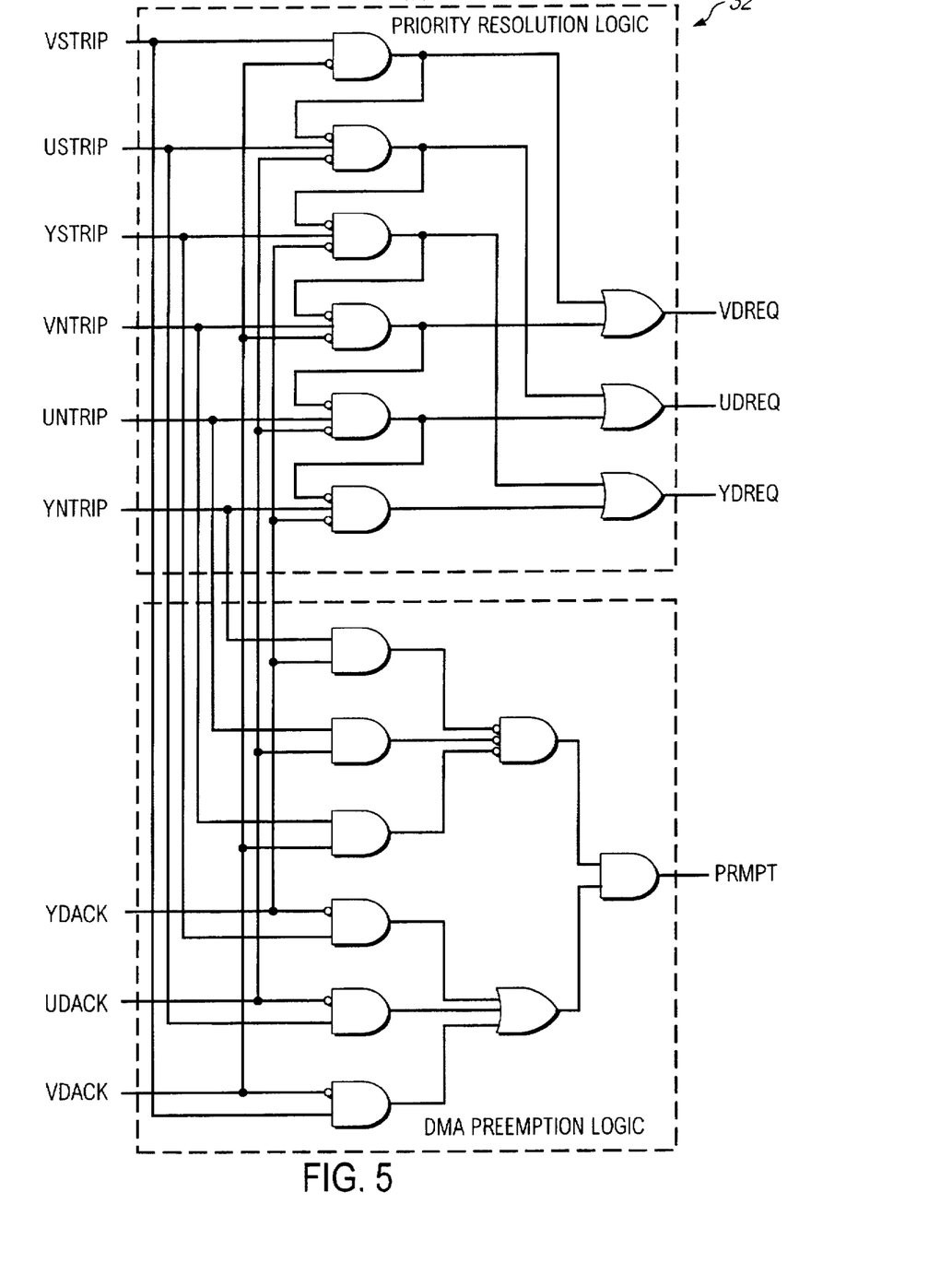
FIG. 5 is a simplified schematic of the PPL Unit depicting the FIFO priority resolution logic as well as the DMA Preemption Logic.

Returning to the PPL Unit 32 of the DMA Unit 3 shown in FIG. 3, this Unit comprises the priority resolution and preemption logic for requesting service of the FIFO buffers from the DMA controller 33. This logic is schematically shown in FIG. 5. When a TRIP signal is input to the PPL Unit 32 from a comparator 12 of the FFE Unit 31, a service request signal is generated for the respective FIFO channel (VDREQ, UDREQ or YDREQ) and transmitted to the DMA controller 33. In turn, the DMA controller 33 transmits back to the PPL Unit 32 a DMA acknowledge signal for the corresponding channel (VDACK, UDACK or YDACK) to inform the FFE Unit 31 which DMA channel will be serviced. It is noted that each of these signals will be in their inactive state when none of the DMA channels are being serviced.

As shown in the schematic of FIG. 5, the DMA channel currently being serviced (if any) is excluded from the priority resolution such that it does not take part in the ongoing arbitration. In the preferred embodiment, a fixed priority scheme is utilized. According to this scheme, each FIFO buffer is assigned a priority with respect to each other FIFO buffer, with the STRIP signals also having priority over the NTRIP signals. In the preferred embodiment, the generated TRIP signals are prioritized from highest to lowest as follows: VSTRIP, USTRIP, YSTRIP, VNTRIP, UNTRIP and YNTRIP.

With respect to this fixed priority scheme, the logic unit will issue a service request to the control unit for the first FIFO buffer having a first trip point signal generated. However, servicing of this FIFO buffer will be preempted upon receipt of either another higher priority first trip point signal or a second trip point signal from a different FIFO buffer. The control unit will then commence servicing of the different FIFO buffer, with this FIFO buffer being serviced either completely where all data entries within the FIFO buffer are written onto the video memory bus 6 or partially where the FIFO buffer is emptied to the level of the first trip point. If the FIFO buffer being currently serviced is being serviced pursuant to a second trip point signal, and another second trip point signal is generated by different, higher priority FIFO buffer, then the control unit will switch the servicing to the higher priority FIFO buffer.

In the second stage of the priority resolution logic shown in FIG. 5, the DMA requests generated in response to the condition of the depth busses exceeding the normal and super trip point values are combined to generate the DMA request signals VDREQ, UDREQ and YDREQ. Furthermore, when a DMA channel currently being serviced is below its normal trip point value and another DMA channel exceeds its super trip point value, the DMA preemption logic of the PPL Unit 32 forces the PRMPT signal active in order to cause the DMA controller 33 to switch the servicing of the FIFOs.

Referring back to FIG. 3, the DMA controller 33 observes the DMA request signals (YDREQ, UDREQ and VDREQ) generated by the PPL Unit 32 on every clock edge during its idle state. When a DMA request is received, the DMA controller 33 asserts a corresponding DMA_REQ signal to request service from the BIU 4. After the BIU 4 wins arbitration and transmits a DMA_ACK signal back to the DMA controller 33, the controller then asserts a corresponding DMA, Acknowledge signal (YDACK, UDACK or VDACK) back to the PPL Unit 32.

During assertion of the DMA Acknowledge signal, the controller then transfers one DWORD (32 bits) of data on every clock edge while the BIU_RDY signal is sampled active. This continues until either the PRMPT signal is sampled active, or the active channel's respective FIFO is emptied as indicated by the xLAST and xBRST signal pairs. When the DWORD transfers on the active channel are either preempted or completed, the DMA controller 33 again samples the DMA request signals (YDREQ, UDREQ and VDREQ). If one of the DMA request signals is found to be active, then the DMA controller 33 keeps the DMA_REQ signal active and begins servicing of the corresponding DMA channel immediately as described above. Otherwise, it deasserts the DMA_REQ signal and returns to its idle state.

According to an alternate priority scheme, if only a normal service request is issued to the DMA Unit 3 for a single FIFO, the FIFO will be serviced until it has been completely emptied. If a normal service request is issued for two or more of the FIFOs, then each FIFO will be completely serviced according to the order in which the requests were received (assuming no super trip point has been reached). However, if a first FIFO is currently being serviced under a normal request while a second FIFO reaches its super trip point, the first FIFO will either 1) be partially serviced or 2) have its servicing immediately preempted if its level of contents is already below the normal trip point. In order to minimize latency and optimize the memory bus bandwidth, the second FIFO will be completely serviced (i.e., emptied) unless another FIFO's super trip point level has been surpassed.

In the case of a first FIFO already being serviced under a normal request while a second FIFO is waiting for normal servicing, the issuance of a super request for a third FIFO will cause the first FIFO to be partially serviced down to its normal trip point where after the third FIFO will then be completely serviced assuming neither the first or second FIFOs surpass their super trip point. Before resuming service of the first FIFO, however, the second waiting FIFO will then be serviced completely. Subsequently, complete servicing of the first FIFO will be performed.

Although both preferred and alternate priority schemes have been set forth in detail, these priority schemes are only exemplary as other priority schemes can also be established without departing from the spirit of the present invention (as long as all super service requests are of a higher priority than all normal service requests).

Furthermore, according to an alternate embodiment of the present invention, an arbitration scheme can be established for servicing each of the plurality of FIFOs sequentially over a period of time so that no two FIFOs would need to be serviced simultaneously. This is accomplished by generating a modulating signal to be transmitted to the DMA controller 33 for sequentially requesting complete servicing of each of the FIFOs in order.

Figure 6:
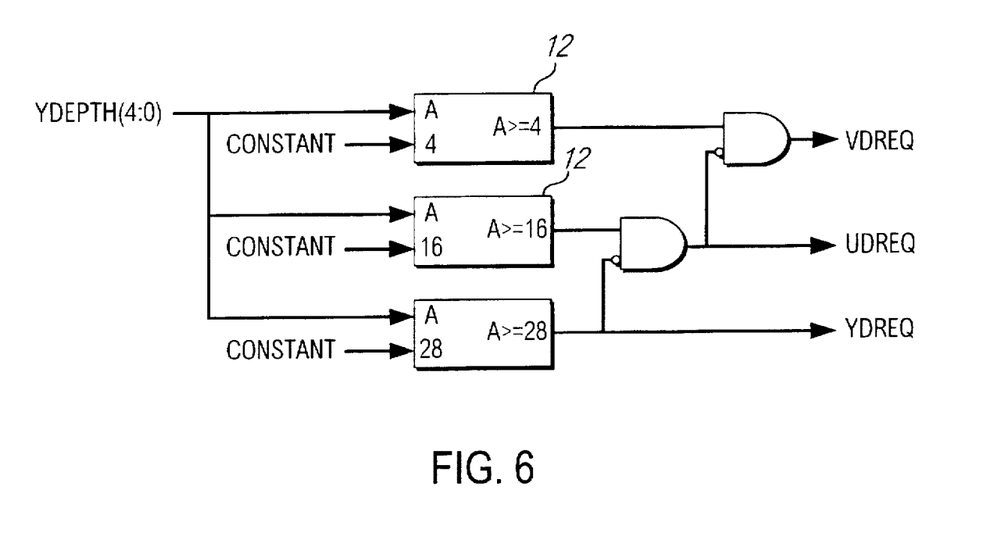
FIG. 6 is a block diagram of a combined FFE and PPL Unit of the DMA Unit according to an alternate embodiment wherein a modulating signal is generated in accordance with the level of contents in one of the FIFO buffers to enable sequential servicing of the FIFO buffers.

According to this implementation, the modulating signal can be generated based on the level of contents in one of the FIFOs. As shown in FIG. 6, the FFE and PPL Units of the DMA Unit 3 would be combined and the trip point registers 7, 8 and comparators 12 would be replaced with three comparators 12 having as input the DEPTH bus of the reference FIFO for comparison against a constant, but different (higher) value for each comparator 12. The output from the comparators 12 would comprise the service requests signals (VDREQ, UDREQ and YDREQ) such that a service request for a different FIFO is generated upon surpassing each trip point level of the reference FIFO.

For instance, assuming each of the first (Y), second (V) and third (U) FIFOs are 32 entries deep and that the first FIFO is used as the reference FIFO, the second (V) FIFO would be completely serviced when the first FIFO has acquired 4 entries. When the first FIFO has acquired 16 entries, the third (U) FIFO would be completely serviced. And when the first (Y) FIFO has acquired 28 entries, it would itself be completely serviced. According to this modulating scheme, all the data transfers would be approximately 28 entries long (an efficient use of the video memory bus 6) except for the very first transfer of a scan line (where the second FIFO would only transfer about 4 entries, while the third FIFO would only transfer about 16 entries). In this manner, there would be no contention for servicing by the different FIFOs because their requests would always be separated. Although the above example has been described using the entry values of 4, 16 and 28, it should be apparent to one skilled in the art that many different selections of entry values in each of the FIFOs may be used to achieve the desired objective.

Alternatively, the modulating signal could also be generated in response to a system clock such as by issuing a service request for a different FIFO every four clock cycles. According to this implementation, however, the modulating signal would also have to be dependent upon the rate of input data transmission as determined by the input FIFO control unit so as to ensure the FIFOs would not be overrun. This could be done, for example, by implementing a free running counter at the front end of the CGA for recording the number of input strobes from the input FIFO control unit. In this way, the number of clock cycles forming the period of the modulating signal would be varied as the rate of data transmission varies.

According to the above descriptions, it should be apparent that the method and apparatus of the present invention permits a reduction in the overall maximum latency that must be allowed for in the size of the FIFOs and in the positioning of the trip points. Consequently, use of the present invention will result in the use of smaller FIFOs in a CGA which are more efficient in bus bandwidth usage. By efficiently managing the FIFOs, smaller, more cost efficient FIFOs can be used which results in smaller and less expensive interface ASICs.

While the invention has been described in conjunction with the preferred embodiment, it is evident that numerous alternatives, depictions, variations and uses will be apparent to those skilled in the art in light of the foregoing description. For example, more than two trip points for each FIFO could be implemented by adding additional trip point registers 7, 8 and comparators 12 in the FFE Unit 31 in order to add different preemptive levels and vary the amount of partial servicing of the FIFOs upon signaling higher priority service requests. Additionally, the FFE Unit 31 may comprise more than three FIFOs for applications other than video processing where it would be advantageous to control the level of contents in the FIFOs according to a priority scheme. Thus, it is understood that the invention is not to be limited by the foregoing illustrative details, but rather is to be defined by the appended claims.

We claim:

1. A method for servicing a plurality of FIFO buffers, each FIFO buffer receiving data entries as input and having an output controlled by a control unit for writing the data entries stored within the FIFO buffers onto a data bus, the method comprising the steps of:

generating a first trip point signal for each FIFO buffer having a depth value equal to or greater than a first trip point value but less than a second trip point value;

generating a second trip point signal for each FIFO buffer having a depth value equal to or greater than the second trip point value;

issuing FIFO service requests from a logic unit to the control unit in accordance with a prioritization scheme for the generated trip point signals, said prioritization scheme selecting among the FIFO buffers for providing data entries to the bus; and servicing the plurality of FIFO buffers in accordance with the prioritization scheme including preempting the service of any FIFO buffer currently being serviced upon generation of a trip point signal having a higher priority according to the prioritization scheme.

2. The method of claim 1, wherein when no second trip point signals have been generated, the step of servicing the plurality of FIFO buffers in accordance with the prioritization scheme comprises the step of servicing in order of trip point signal generation those FIFO buffers having an associated first trip point signal generated.

3. The method of claim 1, wherein when second trip point signals have been generated for each FIFO buffer, the step of servicing the plurality of FIFO buffers in accordance with the prioritization scheme comprises the step of servicing in order of trip point signal generation those FIFO buffers having an associated second trip point signal generated.

4. The method of claim 1, wherein when at least one FIFO buffer has an associated first trip point signal generated and at least one other FIFO buffer has an associated second trip point signal generated, the step of servicing the plurality of FIFO buffers in accordance with the prioritization scheme comprises the step of servicing those FIFO buffers having an associated second trip point signal generated before servicing of those FIFO buffers having an associated first trip point signal generated.

5. The method of claim 1, wherein when at least one FIFO buffer has an associated first trip point signal generated, at least one other FIFO buffer has an associated second trip point signal generated and a FIFO buffer having an associated first trip point signal generated is being currently serviced, the step of servicing the plurality of FIFO buffers in accordance with the prioritization scheme comprises the step of preempting servicing of the FIFO buffer currently being serviced upon receipt of a second trip point signal associated with another FIFO buffer, each FIFO buffer having an associated second trip point signal being serviced in order of trip point signal generation.

6. The method of claim 1, wherein the plurality of FIFO buffers comprises three FIFO buffers of a capture gate array coupled to a video processing device for storing respective Y, U and V bitmap data entries input to the capture gate array.

7. A memory access unit for use in prioritizing the servicing of FIFO buffers in a capture gate array, the CGA being coupled to a video processing device and comprising at least a FIFO Unit having a plurality of FIFO buffers for receiving as input to the CGA separated Y, U, and V bitmap data entries and a bus interface unit coupled to a video memory bus for outputting the data entries to the video processing device, the memory access unit comprising:

a signal generation unit having as input from the FIFO Unit depth values for the FIFO buffers representing the number of data entries currently stored in respective FIFO buffers, the signal generation unit generating a first trip point signal for each FIFO buffer having a depth value equal to or greater than a first trip point value but less than a second trip point value and generating a second trip point signal for each FIFO buffer having a depth value equal to or greater than the second trip point value;

a logic unit coupled to the signal generation unit and comprising logic for prioritizing the generated trip point signals associated with the respective FIFO buffers, the logic unit further generating FIFO service requests in accordance with the prioritized trip point signals; and a control unit coupled between the logic unit and the bus interface unit, the control unit selecting among the FIFO buffers for providing data entries to the bus interface unit and the control unit preempting the service of any FIFO buffer currently being serviced upon generation of a trip point signal having a higher priority.

8. The memory access unit of claim 7, wherein when no second trip point signals have been generated, the control unit services in order of trip point signal generation those FIFO buffers having an associated first trip point signal generated.

9. The memory access unit of claim 7, wherein when second trip point signals have been generated for each FIFO buffer, the control unit services in order of trip point signal generation those FIFO buffers having an associated second trip point signal generated.

10. The memory access unit of claim 7, wherein when at least one FIFO buffer has an associated first trip point signal generated and at least one other FIFO buffer has an associated second trip point signal generated, the control unit services those FIFO buffers having an associated second trip point signal generated before servicing of those FIFO buffers having an associated first trip point signal generated.

11. The memory access unit of claim 7, wherein when at least one FIFO buffer has an associated first trip point signal generated, at least one other FIFO buffer has an associated second trip point signal generated and a FIFO buffer having an associated first trip point signal generated is being currently serviced, the control unit preempts servicing of the FIFO buffer currently being serviced upon receipt of a second trip point signal associated with another FIFO buffer, the control unit servicing in order of trip point signal generation each FIFO buffer having an associated second trip point signal.

12. A method for servicing a plurality of FIFO buffers, each FIFO buffer receiving data entries as input and having an output controlled by a control unit for writing the data entries stored within the FIFO buffers onto a data bus, the method comprising the steps of:

calculating the number of data entries currently stored in a reference FIFO buffer to obtain a depth value for the reference FIFO buffer;

associating each FIFO buffer with a predetermined constant value representing a predetermined number of data entries within a reference FIFO buffer, the constants comprising sequentially larger values for succeeding larger values for succeeding FIFO buffers;

comparing separately the depth value of the reference FIFO buffer with each constant value associated with each respective FIFO buffer;

generating a trip signal for each FIFO buffer having an associated constant value equal to or less than the depth value of the reference FIFO buffer; and servicing the FIFO buffers sequentially in accordance with trip signal generation.

13. The method of claim 12, wherein the steps of comparing separately the depth value of the reference FIFO buffer with each constant value associated with each respective FIFO buffer, generating a trip signal for each FIFO buffer having an associated constant value equal to or less than the depth value of the reference FIFO buffer and servicing the FIFO buffers sequentially in accordance with trip signal generation comprise the steps of:

inputting the depth value of the reference FIFO buffer into a comparator associated with each FIFO buffer, the comparator further having as input the constant value associated with each FIFO buffer;

outputting from each comparator a trip signal associated with the respective FIFO buffer when the constant value of the respective FIFO buffer is equal to or less than the depth value of the reference FIFO buffer;

inputting to an AND gate provided for each FIFO buffer the trip point signal associated with the respective FIFO buffer, each AND gate further having as input an inverted output from each AND gate of a succeeding FIFO buffer; and transmitting the output of each AND gate to the control unit to initiate servicing of a FIFO buffer having an associated AND gate with an asserted output.

14. The method of claim 12, wherein the plurality of FIFO buffers comprises three FIFO buffers of a capture gate array coupled to a video processing device for storing respective Y, U and V bitmap data entries input to the capture gate array.

15. The method of claim 1, wherein the plurality of FIFO buffers includes a set of FIFO buffers, the set containing more than one FIFO buffer, such that all FIFO buffers in the set are in either a read state or a write state with respect to the data bus.

* * * * *